Figure 1:
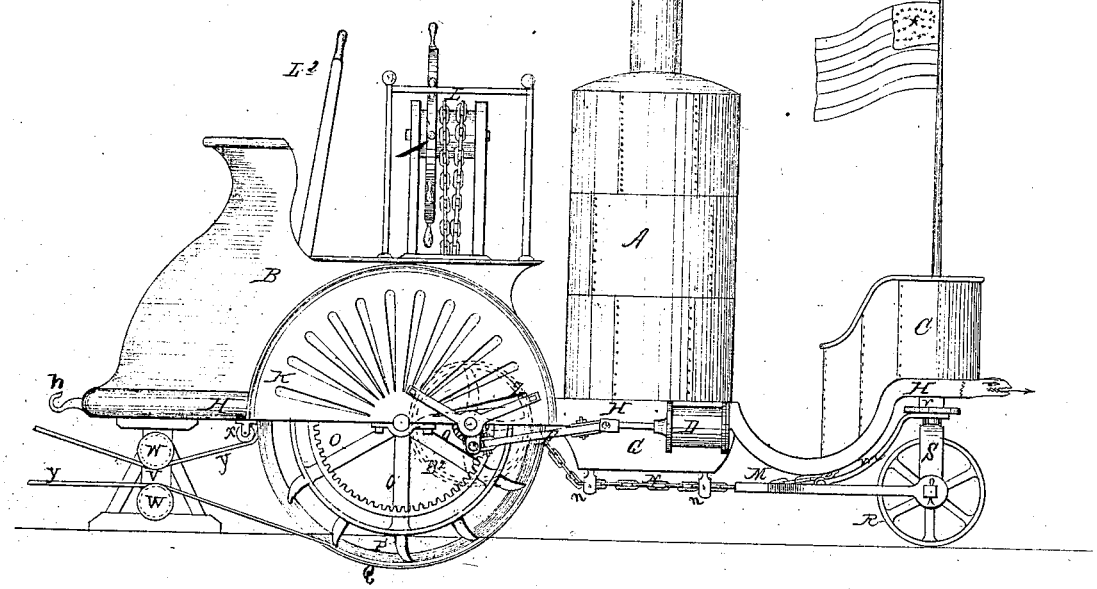

Sheet 1.

ALTAVEAU'S
AMERICAN STEAM-PLOW-REVOLVING HARROW & SEEDER COMBINED

101395

PATENTED MAR 29 1870

WITNESSES

INVENTOR
Augustin L. Taveau

Sheet 2.
A. L. TAVEAU'S
AMERICAN STEAM-PLOW REVOLVING HARROW & SEEDER COMBINED.
101395
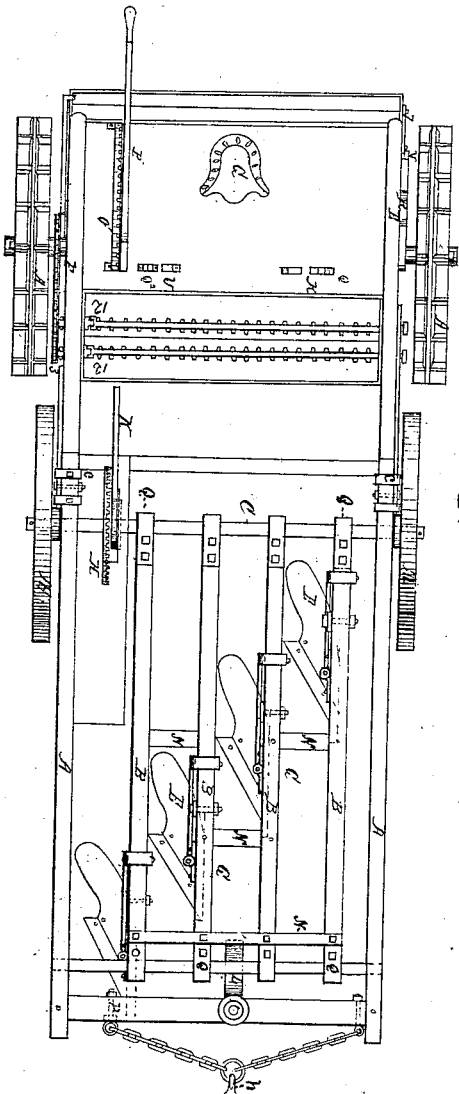
FIG. 4.
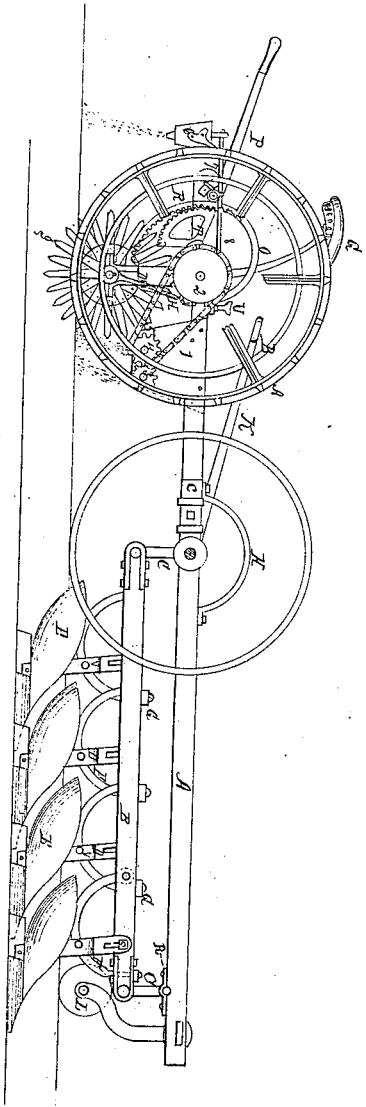
FIG. 3.
WITNESSES
INVENTOR
Augustin L. Taveau
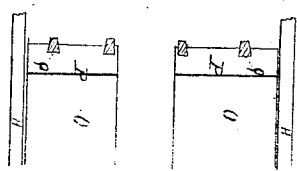

Augustin L. Taveau's
Sulky Gang Plow:
Plate 1. Side Elevation.
101395
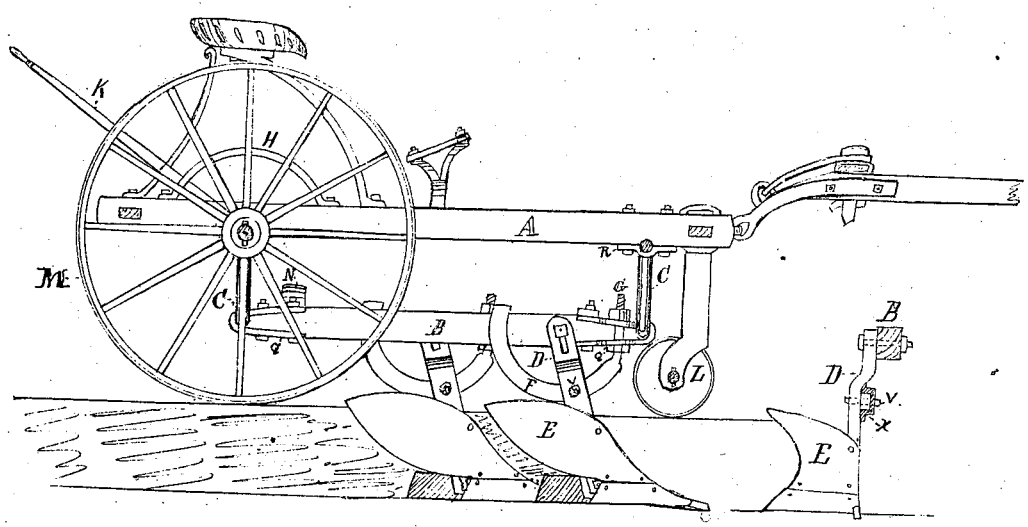
Witnesses:
James L. Kimmell
Abraham Moore
Inventor.
Augustin L. Taveau.

Sheet 4.
101395 Augustin L. Tareau's
Sulky Gang Plow:
Plate 11. Top View.
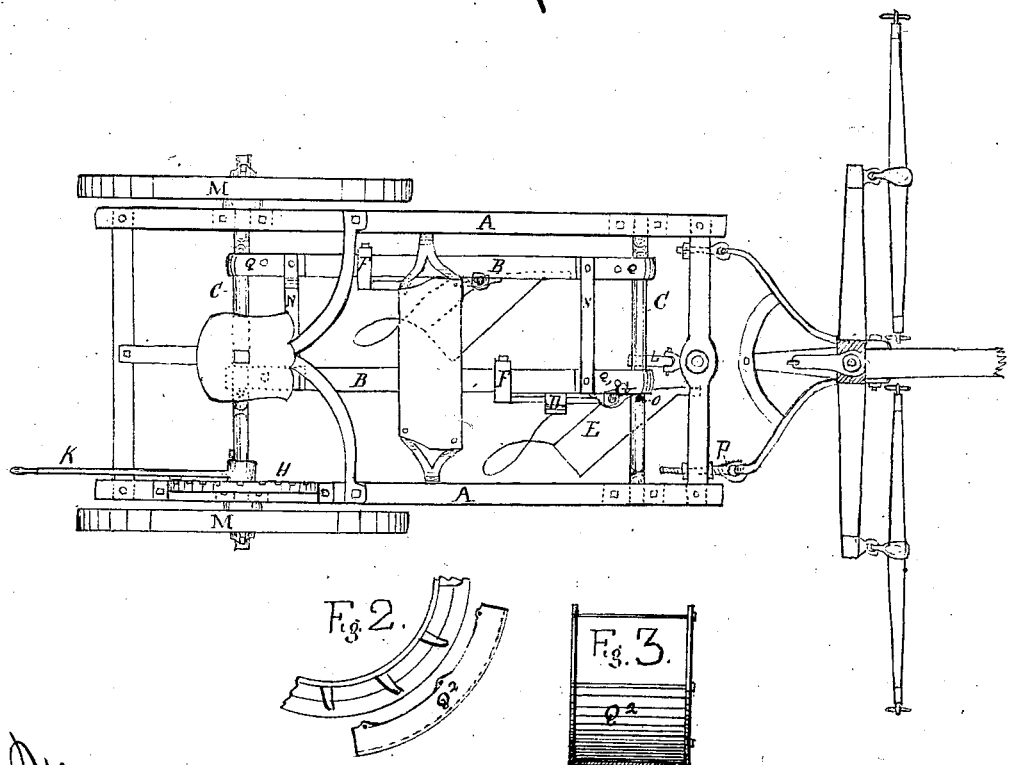
Witnesses:
Samuel Grinnell
Abraham Moore
Inventor.
Augustin L. Tareau

UNITED STATES PATENT OFFICE.

AUGUSTIN L. TAVEAU, OF CHAPTICO, MARYLAND.

IMPROVEMENT IN STEAM-PLOWS.

Specification forming part of Letters Patent No. 101,395, dated March 29, 1870.

*To all whom it may concern:*

Be it known that I, AUGUSTIN L. TAVEAU, of Chaptico, in the county of St. Mary's and State of Maryland, have invented certain Improvements in steam apparatus for plowing, road and field rolling, driving farm and other machinery, or for traction-purposes, of which the following is a specification.

The first part of my invention relates to a locomotive-engine mounted upon traction and guide wheels, and operated in such a manner that the steam-power shall communicate motion to the traction-wheels by means of the cylinders, piston, and connecting-rods, actuating-cranks, chains, or cog-gear, either together or separately, as circumstances may require. The guide-wheels in front are made to control the direction of progress by means of the steering tiller or pole, operated by the chains attached to the pilot-wheel.

The second part of my invention relates to the attaching to the rear of the engine, by means of a chain or other device, connecting with the hook behind the engine, a gang of plows. The plows may also be worked by horse-power by a pole attachment and seat. Whenever it may be desirable to plow, fertilize, seed, and harrow a field at one operation, my revolving harrow and seeder combined may be attached by suitable bolts, as seen in the drawings, at the rear ends of the plow-frame.

The third part of my invention relates to attaching a set of broad detachable tires around the periphery of the traction-wheels of the engine, in order that it may perform the functions of a steam road or field roller or for traction purposes.

The fourth part of my invention relates to a jack or stanchion for relieving one side of the engine off of the traction-wheel, in order that by passing a belt around the wheel or other device the engine may be used for driving machinery. Machinery may also be driven by removing the pinions and cranks and substituting therefor a detachable shaft and cranks, having a pulley at its outer end for carrying a belt, and the connecting-rods are attached to these cranks in the same manner as to the pinion-cranks.

Figure 2:
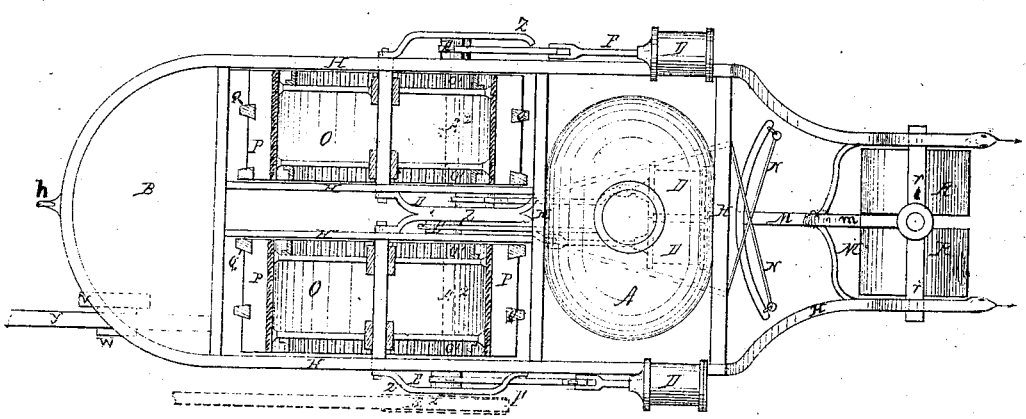

In the drawings, Sheet 1, Figure 1, is a side elevation of the engine. Fig. 2 is a top view or plan of the same. Sheet 2, Fig. 3, is a side elevation of the plows. Fig. 4 is a top view or plan of the same. Sheet 3, Plate 1, is a side elevation of plows for horses. Sheet 4, Plate 2, is a top view or plan of the same. Fig. 2 is a side elevation of detachable tires. Fig. 3 is a perspective view of the same.

*Description of the engine.*—H is the frame, which should be substantially constructed, to bear the weight and resist the strain of the operating parts. This frame H is supported chiefly by the axles of the traction-wheels O, and also in front by the cross-bar $r$. This cross-bar $r$ is pivoted to the vertical post of the guide-wheels R, and the guide-wheels R have their axle resting in the cheeks of the frame S. The upper portion of this frame S is united in one vertical post, which passes up through the cross-bar $r$, under the coal-bunk C, and is secured in the manner usual in caster-wheels. A forked tiller or pole, M, attached to each side of the axle of the guide-wheels R, and supported from above by the brace-rods $m$, and furnished with a cross-bar at its end, is operated by the chains, ropes, wires, or rods N passing through appropriate blocks or sheaves under the boiler and ash-pit G, thence between the wheel-houses K, and up through the flooring to the pilot-wheel L. The traction-wheels O are keyed upon their axles, and these axles rest in boxes bolted under the frame H. Attached to the spokes of the traction-wheels O is an internal gearing, which meshes with the four pinions O'. These pinions O' are supported upon the inner end of the journals of the cranks, and the inner journals of the cranks have their bearings in boxes bolted under the frame H, and their outer journals have their bearings outside in strong braces Z, bolted to the sides of the frame H. These pinion-cranks are quarter-cranks, and are attached to the connecting-rods F, and thus, when the steam-power of the generator A is applied to the connecting-rods F through the cylinders D, the pinions O' are made to revolve, and through the gearing of the traction-wheels O produce motion and propel the engine. The axles of the traction-wheels O act independently of each other, for the purpose of allowing the traction-wheels O to move at different speeds in turning curves, or of turning inversely to each other, or for using one of the wheels as a band-wheel, for driving machinery when the engine is stationary. The cleats P on the rims of the traction-wheels O are intended to secure traction and resist slip. These cleats may be either straight or curved to the front or rear, and are strengthened by the circular ribs Q, extending around and between them. These ribs Q also serve as tires for protecting the cleats P when passing over hard soil. They are placed upon the wheels in the line of draft of each plow, for the purpose, also, of acting as revolving colters to the plows, as well as affording additional traction to the traction-wheels O in field-work. When it is desirable to use the engine as a steam road or field roller, or as a traction-engine on common roads, the detachable broad tires $Q^2$, Sheet 4, Figs. 2 and 3, are secured around the face of the traction-wheels O in convenient sections by bolts or other suitable device or devices. When the engine is to be used as a motive power for driving any other class of machinery not herein specified, the stanchion V, Sheet 1, Figs. 1 and 2, is placed under one end of the frame H, in rear of the wheel to be used, to sustain the weight of that portion of the engine. The soil is then removed from under that wheel, and a belt is passed around this wheel, thence between the two tightening-pulleys W on the stanchion V, thence onto the machine to be operated. A friction-roller, X, under the frame H in rear of the wheel, serves as a guard to preserve the belt from wear against the frame H. When the machine to be driven does not require so great a power as that transmitted by the wheel O, as just mentioned, the pinions and cranks O', in Sheet 1, Figs. 1 and 2, are removed and disconnected from the connecting-rods F, and a shaft, $A^2$, with quarter-cranks, is substituted, and a band-pulley, $B^2$, is keyed upon the outer end of the journal outside of the braces Z. The quarter-cranks are then attached to the connecting-rods F, and are operated, like the pinions, by the cylinders and piston-rods. Two shafts, $A^2$, may be used, either coupled or independent, for the purpose of transmitting the whole power of the engine to one pulley, or for driving two independent shafts and pulleys, for operating two or more machines at once. The wheel-house K incloses the upper portion of the traction-wheels O, and supports the flooring of the pilot-wheel L. Its rear forms the front of the water-tank B. The water is conveyed to the boiler A by suitable pipes in the usual manner. The engine is a double engine, each with two cylinders, D, and by means of right and left hand levers $L^2$ and proper cut-offs the pilot works either wheel O backward or forward, at will. The boiler A is an upright tubular boiler firmly secured to the frame H, with furnace, fire-box, grate, and ash-box placed in any manner most convenient. The coal-bunk C is bolted down on the frame H, forward of the boiler A, over the guide-wheels R. The cylinders D are also bolted to the frame H, and the two middle cylinders are placed in an arch under the boiler A.

*Description of the plows.*—A is the frame of the carriage. The crank-bars C are pivoted to it in the boxes R, bolted under the frame A, as seen in Sheet 2, Figs. 3 and 4. The plow-beams B are hung at both ends on the crank-bar C by iron straps Q, bolted through. The forward part of the beams B, over and a little in front of the standards D, has a box on the side of the beams B, next the standards D, to receive the upper and forward ends of the curved bars F, and this portion of the curved bar F is round, and has a thread for receiving the adjusting-nuts G. These nuts G, in conjunction with the thread on the upper and forward part of the curved bars F, are used for raising or depressing the plow-points. The remainder of the curved bar F is flat, and passes through the clamps X on the landside of the standards D, thence upward and over the beams B in a true circle, and is pivoted to the beams B on their inner sides. These curved bars F have a hole which corresponds with the holes V on the clamps X and standards, for receiving a wooden break-pin. The standards D are pivoted to the beams B by a bolt through the slots in their upper ends. Just below the slot the standards D are bent outward, and downward, if necessary, to permit the clamps X to run clear of the outer edges of the beams B when an obstruction breaks the wooden pin and a plow jumps out of the ground. A gong may be placed upon the beams B, just in rear of the curved bars F, to be struck by the plow when the plow breaks the wooden pin, and thus attracts the attention of the operator. The beams B are secured together by cross-ties N. The rear crank-bar C projects beyond the frame A, and serves also as axles for the wheels M. These wheels M are removed whenever it is desirable to attach my revolving harrow and seeder combined, and the attachment is made by the bolts and bars c, as shown in the drawings. The plow-carriage A is attached to the engine by chains or other device, connecting with the hook h in rear of the engine. A pole and seat attachment is to be used when operated by horses, as seen in Sheets 3 and 4. The eyebolt P, as seen in Sheets 2 and 4, is double-nutted, for adjusting the width of cut. The lever K is keyed to the rear crank-bar C, for operating both crank-bars C together, and may be connected, if desirable, to the front crank-bar C by a rod or other device. The radial bar H is provided on one side with notches for receiving the stop on the lever K, by which the position of the plows is regulated. The forward part of the plow-carriage A is supported by the caster-wheel L.

What I claim as my invention, and desire to secure by Letters Patent, is—

1. The construction and arrangement of the traction-wheels O, cleats P, and ribs Q, constructed and operating as and for the purpose as herein set forth and described.

2. The broad detachable tires $Q^2$, constructed and arranged as specified, in combination with the elements of the foregoing claim.

3. The arrangement of the pilot-wheel L with the chains, ropes, wires, or rods N, steering tiller or pole M, and blocks or sheaves $n$, in combination with a steam-plowing apparatus, operating as and for the purpose herein set forth.

4. The arrangement of the stanchion V, pulleys W and X, in combination with the wheel O and belt Y, operating as and for the purpose set forth.

5. The arrangement of the detachable shaft $A^2$, band and band-pulley $B^2$, in combination with the frame H, piston, and connecting-rods F, operating as and for the purpose herein set forth.

6. The arrangement of the crank-bars C, beams B, and standards D, in combination with the lever K, radial bar H, caster-wheel L, and frame A, operating as and for the purpose set forth.

7. The construction and arrangement of the standards D, curved bars F, and clamps X, in combination with the adjustable screws and nuts G, wooden pins and holes V, and beams B, operating as and for the purpose herein set forth.

AUGUSTIN L. TAVEAU.

Witnesses:
 JAMES S. GRINNELL,
 ABRAHAM MOORE.